United States Patent [19]

O'Meara et al.

[11] Patent Number: 5,396,364
[45] Date of Patent: Mar. 7, 1995

[54] CONTINUOUSLY OPERATED SPATIAL LIGHT MODULATOR APPARATUS AND METHOD FOR ADAPTIVE OPTICS

[75] Inventors: Thomas R. O'Meara, Malibu; Phillip V. Mitchell, Simi Valley, both of Calif.

[73] Assignee: Hughes Aircraft Company, Los Angeles, Calif.

[21] Appl. No.: 969,686

[22] Filed: Oct. 30, 1992

[51] Int. Cl.6 .................................................. G02F 1/29
[52] U.S. Cl. ..................................... 359/292; 359/295; 250/201.9
[58] Field of Search ............... 359/290, 291, 292, 295, 359/230; 358/62, 233; 250/201.9; 356/121; 340/764, 783

[56] References Cited

U.S. PATENT DOCUMENTS

| | | |
|---|---|---|
| 3,233,040 | 2/1966 | Crane .................................. 358/233 |
| 3,330,908 | 7/1967 | Good et al. ........................... 359/292 |
| 4,239,312 | 12/1980 | Myer et al. . |
| 4,737,621 | 4/1988 | Gonsiorowski et al. ........... 359/291 |
| 4,794,296 | 12/1988 | Warde et al. . |
| 4,800,263 | 1/1989 | Dillon et al. . |
| 4,822,993 | 4/1989 | Dillon et al. . |
| 4,851,659 | 7/1989 | Dillon et al. . |
| 4,863,759 | 9/1989 | Warde et al. . |
| 4,967,063 | 10/1990 | Wang et al. ........................ 250/201.1 |
| 5,032,896 | 7/1991 | Garvin et al. . |
| 5,046,824 | 9/1991 | Pepper ............................... 250/201.9 |
| 5,090,795 | 2/1992 | O'Meara et al. . |

Primary Examiner—John T. Kwon
Assistant Examiner—F. Daniel Lopez
Attorney, Agent, or Firm—V. D. Duraiswamy; W. K. Denson-Low

[57] ABSTRACT

A spatial light modulator that is particularly suited for adaptive optics systems includes a charge transfer plate in which accumulated charge is continuously drained from the charge transfer pins, allowing the modulator to be operated in a continuous mode with a very rapid speed of response. Charge is drained through RC circuits that consist of inherent or discrete resistors and inherent capacitances associated with the pins. A lenslet array focuses an input beam onto the curvature bases of pixels in an associated deformable mirror, thereby obtaining reflections from the mirror with generally flat wavefronts and a greatly increased optical efficiency; a companion lenslet array and mirror combination outside the SLM compensates pixel inversions produced by the first lenslet array. The charge transfer plate is made gas impervious by fabricating the charge transfer pins as thermally migrated conductors, and conductive electric shield pins are preferably also provided to shield the charge transfer pins from each other.

26 Claims, 4 Drawing Sheets

CONTINUOUSLY OPERATED SPATIAL LIGHT MODULATOR APPARATUS AND METHOD FOR ADAPTIVE OPTICS

BACKGROUND OF THE INVENTION

1. Field of the Invention

This invention relates to adaptive optics systems used to compensate for rapidly changing air turbulence, and to spatial light modulator designs and methods used therein.

2. Description of the Related Art

Innovative adaptive optics systems are a class of adaptive optics systems used to compensate for atmospherically-induced aberrations that are imposed upon a beam traveling through the atmosphere to a detector. Such systems generally transmit a reference laser beam to a target which is being observed. The laser beam is reflected from the target and accompanies the target image beam back to the detector, picking up the same aberrations along the way. At the detector the reflector laser beam is beat against an unaberrated reference laser beam of the same frequency to produce a spatial interference pattern that corresponds to the spatial phase distortions imposed upon the input target beam. A control beam that bears the interference pattern as a spatial intensity distribution is applied to a spatial light monitor (SLM), which translates the pixelized intensity pattern into a pixelized phase adjustment for the aberrated input beam. The phase adjustment provided by the control beam compensates for the atmospheric distortions, and allows an essentially undistorted output beam to be obtained.

Both innovative and conventional adaptive optics systems have not been very successful for applications involving rapidly changing atmospheric conditions, such as imaging through boundary layer turbulence from an aircraft platform, atmospheric turbulence, and astronomical studies under high velocity wind conditions. In one approach a liquid crystal light valve (LCLV) has been used for the SLM. This approach is described in U.S. Pat. No. 5,090,795 to T. R. O'Meara and C. C. Valley, assigned to Hughes Aircraft Company, the assignee of the present invention. The single layer LCLV used as a spatial light modulator in this system had a maximum closed-loop response speed of 1 millisecond or less, whereas much faster response times are required for rapidly changing atmospheric conditions. Attempts to speed up the LCLV response time by multi-pass designs were found to sacrifice optical efficiency and increase the difficulty of alignment.

Membrane light modulators have also been developed, in which a spatial optical intensity pattern is converted to a pixelized electron flow that accumulates charges on the pins of a charge transfer plate. Such light modulators and their component are described in U.S. Pat. Nos. 4,800,263 and 4,822,993 to Dillon et al., and U.S. Pat. Nos. 4,794,296 and 4,863,759 to Warde et al. The accumulated charges produce pixelized deformations in a deformable membrane mirror from which the aberrated input beam is reflected. Since each mirror deformation imparts a phase shift to its corresponding input beam pixel in proportion to the amount of deformation, which in turn is a function of the accumulated charge on the corresponding charge transfer pin, the interference intensity pattern produced by beating the aberrated and unaberrated reference laser beams against each other is translated to a pixelized phase correction for the input beam. Since charge continuously accumulates on the plate, the prior systems are operated in a frame mode, in which input frames are separated by erase pauses during which the accumulated charge is removed from the charge transfer plate. The result is a frame rate of typically 10 milliseconds or slower. Furthermore, the charge removal process causes the mirror state to be unsuitable for compensation purposes for appreciable intervals, such that the beam to be compensated would typically be required to be shut off during erase and during a portion of the subsequent reset period.

In FIG. 2 of U.S. Pat. No. 4,794,296 a low resistance enhancer coating is formed over the back surface of the charge transfer device so that ". . . electronic charges bleed off the enhancer coating at a specific rate"; this is said to allow the subject charge transfer signal processor to be operated in a continuous mode. However, the continuous low resistance coating would establish different charge drain rates for the device's different charge transfer pins, depending upon each pin's particular location. Some pins would see a longer and thus higher resistance path, while others would see a shorter and thus lower resistance path. The varying charge drainage rates result in different response times for the different pin locations, making the device unusable for applications such as adaptive optics that require rapid response rates.

The prior charge transfer plates were fabricated by forming a matrix of holes through an insulative substrate, and then filling the holes with a conductive material. This fabrication process often leaves pathways through the charge transfer plate, through which outgassed organic materials from the membrane mirror can seep to contact the photocathode used to generate the pixelized electron flow onto the charge transfer plate. The photocathode is highly sensitive to such materials, and rapidly deteriorates in their presence. Also, the actual process of forming the conducting pin matrix can trap gases in the holes, which later outgas and again reduce the lifetime of the photocathode. The difference of expansion coefficients between the pins and glass also makes a thermally unstable system which limits the types of microchannel plate amplifiers that can be used in the device.

A further problem with prior membrane light modulators relates to the manner in which the membrane mirrors are deformed by the accumulated charges on the charge transfer plate. Each pixel of the membrane mirror deforms along a curved surface, which imparts a similar curvature to the wavefront of the input beam pixel which it reflects. Since different mirror pixels will be deformed by differing amounts, and will therefore have different curvatures, the reflected beam pixels will similarly have differing wavefront curvatures and focal lengths. However, it is highly desirable that the reflected wavefronts be flat. Since only the centers of each mirror pixel are relatively flat, only the light reflected from these small center areas is used. In prior applications the rest of the light, typically representing in excess of 99% of the total input beam, is simply discarded.

SUMMARY OF THE INVENTION

The present invention seeks to provide an improved spatial light modulator which has a much faster response than was previously attainable, is suitable for use with adaptive optics systems in turbulent atmospheric conditions, exhibits greater sensitivity in noncoherent imaging applications, is operable in a continuous mode, and is subject to less outgasing problems than with previous SLMs.

These goals are achieved by continuously draining accumulated charge from the charge transfer plate at a controlled rate that allows for a continuous operation of the SLM, without inter-frame charge erasures. The charge drainage path is established through an array of resistors connected between the various charge transfer pins and a reference voltage, preferably ground. Together with pin-to-pin and mirror-to-pin capacitances, the resistors establish RC time constants for the drainage paths that prevent excess charge accumulation and yet allow sufficient charge to be maintained on the pins to control the deformable mirror during the continuous operation. By employing short RC time constants, the mirror deformations can rapidly and continuously track the wavefront errors.

The optical efficiency is markedly improved by adding an array of lenslets that focus an input beam onto the relatively flat curvature bases of the mirror pixels, rather than onto the more highly curved portions of the mirror's pixelized surfaces. The resulting phase corrected reflections from the mirror have generally flat wavefronts, allowing most or all of the reflected light to be used. The lenslets preferably comprise a continuous array of microlenses without gaps between adjacent microlenses, and are positioned to collimate light reflected back from the mirror pixels.

A new structure is also provided for the conductive pins of the charge transfer plate. The pins are grown by a thermal migration process that avoids the establishment of any openings in the plate through which outgassed products from the mirror membrane can leak to the photocathode, and also avoids any accumulation of gaseous products in separately formed openings. An array of shield conductors also preferably extends through the transfer plate, generally parallel to the plate's charge transfer pins, to electrically shield the pin pixels from each other. The shield conductors may also provide the discharge path ground electrodes, if the charge transfer plate is conductive.

In addition to a faster, continuous operation, greater efficiency and reduced outgasing, the invention provides a larger dynamic range than a liquid crystal light valve, and can be designed to operate over the full range from infrared to ultraviolet. It is polarization insensitive and free of dispersive effects, and has a higher resolution than prior deformable mirror modulators. Other advantages include a thermally stable operation which allows higher current microchannel plate amplifiers to be used, and a thermal conductivity about half that of copper which allows for heat extraction from the center of the microchannel plate amplifier and thus inhibits thermal run-away.

These and other features and advantages of the invention will be apparent to those skilled in the art from the following detailed description, taken together with the accompanying drawings.

DETAILED DESCRIPTION OF THE INVENTION

Figure 1:
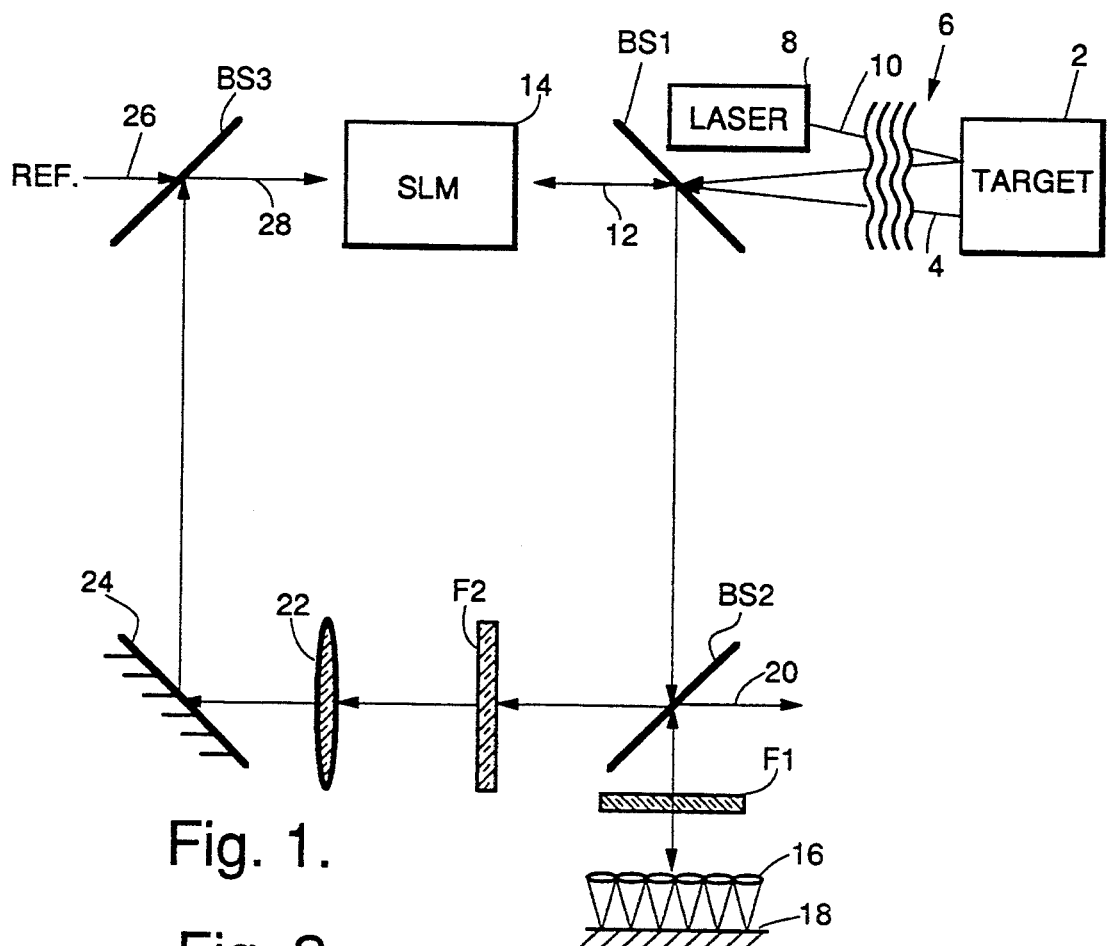
FIG. 1 is a block diagram of an adaptive optics system in accordance with the invention.

FIG. 1 shows an adaptive optics system that incorporates the invention. A distant target 2, such as an aircraft or satellite, reflects an electromagnetic beam 4 through a turbulent atmosphere 6 to the optical system. The beam can be reflected ambient light, or it can be a communications beam originated by the target. While a primary application for the invention is optical imaging of a distant target, it is also applicable in other areas such as spectroscopy through turbulent layers to permit the viewing of reactions in process.

A local laser 8, such as an argon ion laser with a wavelength of 514.5 nm, transmits a beam 10 that is reflected off the target and makes a double transit through the atmosphere before returning along with the target input beam 4. The laser beam acquires wavefront aberrations during its passage through the atmosphere that correspond to the aberrations imposed upon the input beam 4; these laser aberrations are detected by the adaptive optics system and used to compensate for the target beam aberrations, with the object of restoring the target beam wavefront to its original state prior to passage through the turbulent atmosphere.

The returned laser and target beams are processed through a first beam splitter BS1 and directed as a combined beam 12 onto an SLM 14. Assuming the system operation has just begun and the SLM is not yet providing phase corrections, the aberrated beams are reflected off the SLM without phase correction and are then redirected by the beam splitter BS1 to a second beam splitter BS2. To avoid the optical losses associated with two passes through the beam splitter, a mirror could be substituted for the beam splitter and positioned just off the input beam axis, and the SLM oriented at a slight angle to the input beam, so that the beam strikes the mirror only after it has been reflected from the SLM.

At the second beam splitter a portion of the beam is divided between a first filter F1 that blocks the laser wavelength but transmits the target beam, and a second filter F2 that transmits the laser wavelength but blocks the target image beam. The image beam that is transmitted through filter F1 is focused on a pixelized basis by an array of lenslets 16 that match a lenslet array in the SLM 14 (described below). A plane mirror 18 is provided at the focal distance from lenslet array 16, and reflects the focused pixelized beams back through the lenslets 16 and filter F1 to the beam splitter BS2, which directs a portion of the returned beam as a compensated output image beam 20. The purpose of the lenslet array 16 is to compensate for an inversion of each of the pixel images that occurs with the SLM, so as to yield a compensated output image 20 whose pixel images are re-inverted to a proper orientation.

Figure 2:
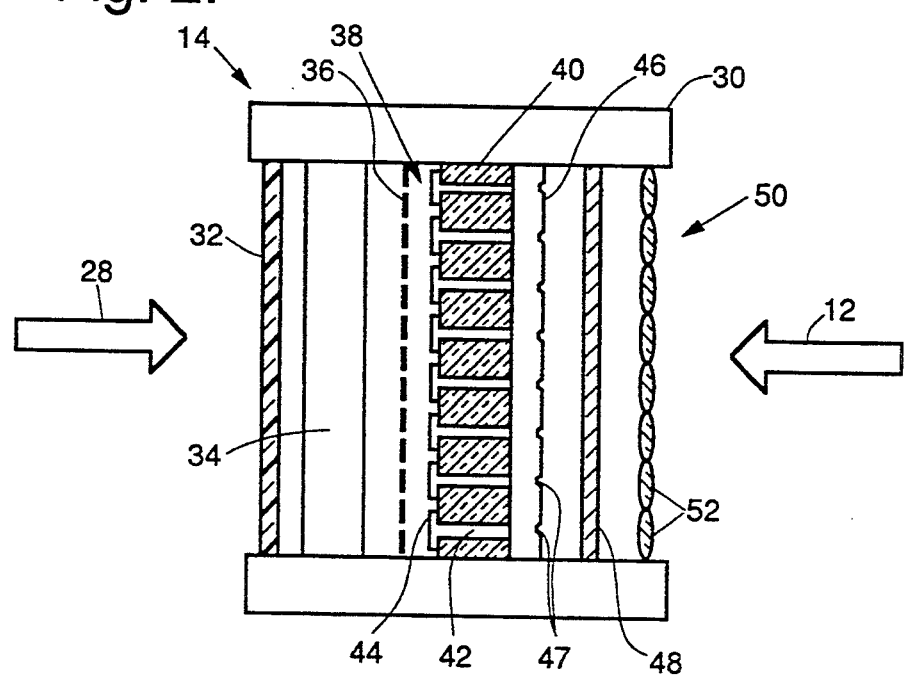
FIG. 2 is a sectional representation, not to scale, of a charge transfer plate in accordance with the invention.

The portion of the laser beam that is directed through the laser line passing filter F2 is imaged by one or more imaging lens 22 and directed by a mirror 24 via a third beam splitter BS3, to the SLM's photocathode (identified by numeral 32 in FIG. 2). This imaging system must replicate the residual aberration field structure reflected from the SLM at the photocathode structure. Here the aberrated laser beam is beat against a reference laser beam 26 that is in-phase with the original beam from laser 8; the reference beam may be obtained directly from the laser 8, with a delay as necessary to compensate for the laser beam transit time to and from the target. The beating of the aberrated laser beam against the local reference beam at BS3 essentially establishes an interferometer, in which the residual wavefront error in the aberrated beam is encoded as a spatial variation in the irradiance intensity of the output beam 28 from BS3. This intensity-encoded beam 28 is applied as a control to the SLM 14. The SLM in turn produces a spatial phase correction for the input beam 12 as a function of the spatial intensity pattern of control beam 28. A closed loop system is thus established in which wavefront phase aberrations are translated to a spatial intensity pattern, which in turn is used to compensate for the input phase aberrations. As a result, most of the phase aberrations are removed from the input target beam upon reflection from the SLM 14, so that the output beam 20 has only a low level of atmospherically imposed aberrations.

FIG. 2 shows the general construction of an SLM that can be used in the described adaptive optics system. The operative components of the SLM are retained within a vacuum housing 30. A conventional photocathode 32 receives the control beam 28 and converts its spatial optical intensity pattern to a matching spatial electron emission pattern that is applied to a microchannel plate amplifier 34, which again can be of conventional design. The microchannel plate amplifier emits an amplified version of the electron pattern from the photocathode 32 through a grid 36, and onto a charge transfer plate 38. Secondary electrons are emitted from the charge transfer plate in response to the incident primary electrons from the microchannel plate amplifier 34. The grid 36 can be charged either negatively to return the secondary electrons to the charge transfer plate, thereby causing the plate to accumulate a negative charge, or positively to draw secondary electrons away from the charge transfer plate and cause it to accumulate a positive charge. The primary electrons from the microchannel plate amplifier are faster than the secondary electrons given off from the charge transfer plate, and are not substantially deflected or captured by the grid. The present invention can operate either in an accumulation mode, in which secondary electrons accumulate a negative charge on the charge transfer plate, or in a depletion mode in which secondary electrons are removed and the charge transfer plate accumulates a positive charge.

The charge transfer plate 38 consists of a substrate matrix 40, typically glass or silicon, through which an array of conductive pins 42 extend. The pins preferably have enlarged heads 44 along the side of the plate that faces the microchannel plate amplifier 34 to provide enlarged electron collection areas. Each pin functions as a pixel activation electrode in compensating for phase distortion in the input beam. Either a negative or a positive charge is accumulated on the pins in response to received electrons from the microchannel plate amplifier, as described above.

A deformable membrane mirror 46 is placed over the opposite side of the charge transfer plate from the received electrons. The deformable mirror can be of conventional design, typically consisting of a sheet of organic material such as nitrous cellulose coated with a reflective conductor such as gold, silver or aluminum. Charges accumulated on the charge transfer plate pins 42 produce an electrostatic attraction that cause the adjacent portions of the membrane mirror 46 to deform inward towards the pin. The amount of mirror deformation over each pin is a function of the accumulated charge on the pin, which in turn depends upon the magnitude of electron current flow received by the pin. Thus, the mirror deformation at any particular pixel location will vary in positive proportion to the intensity at the corresponding location in the control beam 28, which in turn is a function of the amount of phase distortion present at that pixel location in the input laser beam. Since the input beam 12 has to traverse a greater distance to reach those portions of the mirror which have been deformed, its spatial wavefront aberrations are compensated by imparting a spatial deformation pattern to the mirror 46 that corresponds to the pixelized of aberration pattern.

An input window 48 is provided in front of the charge transfer plate and membrane mirror to preserve the vacuum within the housing, and a lenslet array 50 is placed in front of the window to focus the input beam onto the array of mirror pixels; the positions of the window 48 and lenslet array 50 can be reversed if desired. The lenslet array 50 is an important feature of the invention, and as described below it enables a much more efficient operation than has previously been attainable.

Each of the individual microlenses 52 within the overall array is aligned with a corresponding mirror deformation site 47, and focuses the incident portion of the input beam onto the center of that mirror pixel. The lenslet array is formed as a continuous structure, with substantially no gaps between adjacent microlenses so that substantially all of the light in the input beam is focused onto the various mirror pixel centers. The lenslets should have a very high optical quality, and be near diffraction limited with a small f number to inhibit the introduction of distortions. Lenslet arrays of this type can be fabricated photolithographically. Since the conductive pins of the charge transfer plate are preferably also fabricated with a photolithographic process, as described below, the same mask can be used for the conductive pins and the lenslet array to assure a complete alignment between the two. The rotational position of the lenslet array within the housing can be adjusted, for example with an adjustment screw, so that each of its constituent microlenses is precisely aligned with a corresponding conductive pin in the charge transfer plate.

Figure 3:
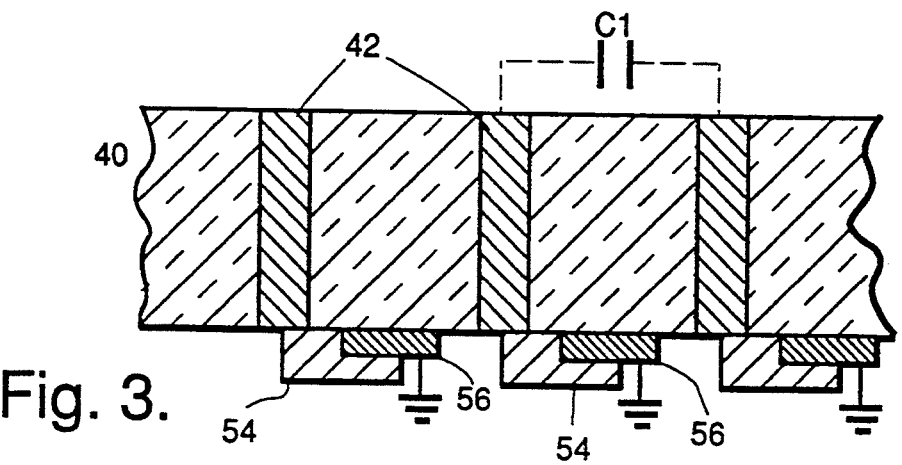
FIG. 3 is a fragmentary sectional view illustrating the manner in which accumulated charge is drained from the conductive pins of the charge transfer plate.

FIG. 3 illustrates a generic feature of the invention that allows the SLM to be operated in a continuous mode, with a much faster response time than has previously be attainable. A portion of a charge transfer plate is shown, with conductive pins 42 extending through the substrate 40. A path is provided to drain off the charge accumulated on the individual pins, thus preventing a continuous accumulation of charge that previously required an intermittent frame operation with charge erase intervals. The rate at which charge is drained from the charge transfer plate is selected to be slow enough to sustain an accumulated charge for a constant rate of charge application to the charge transfer plate, but fast enough for the accumulated charge to respond to a change in the rate of charge application within a desired response rate. The drain path consists of a resistance-capacitance (RC) network that is connected between each pin and a drain voltage potential, preferably a ground reference. The resistance means is selected to establish, together with the capacitance, a common time constant for draining charge from the pins. Thin film resistors 54, formed from materials such as chrome silicide or titanium oxide, are provided on a surface of the substrate between each pin 42 and a grounded contact 56. Although the contacts 56 are illustrated as discrete elements, they are preferably part of an overall conductive sheet that is placed over the charge transfer plate, with openings in the sheet at the pin locations. As an alternate to the discrete resistors 54, it may be possible to provide the charge transfer plate substrate 40 as a weakly conductive material that provides a resistive path between the pins and a ground reference.

The capacitive component of the RC pin circuits is provided primarily from two sources. The first is the inherent pin-to-pin capacitance, symbolized by capacitor C1, that exists by the nature of the conductive pins separated by a dielectric. The second is a pin-to-conductive mirror capacitance and pin-to-ground electrode 56 capacitance. These capacitances can be calculated from the geometries of the pins and mirror, with the two principal components typically being of similar orders of magnitude. In order that the membrane activation signals not be cross-coupled, it is important that the pin-to-ground electrode capacitance be larger than C1. For a typical charge transfer plate with a diameter approximately 4–8 times its thickness, a pin-pin spacing on the order of 1 mm and maximum pin diameters consistent with an absence of pin-to-pin field interference, the resistors 54 would typically be on the order of 100 Megohm or more, and the capacitance associated with each pin would typically be less than 2 pF. With such an arrangement, the RC time constant would be on the order of microseconds.

Figure 4:
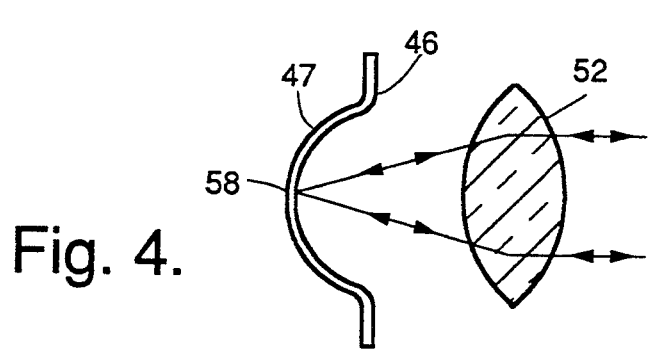
FIG. 4 is an enlarged fragmentary view illustrating the focusing of an input beam by the lenslet array onto the curvature bases of the deformable membrane mirror.

An enlarged illustration of how the microlenses 52 greatly improve the SLM's optical efficiency, and also improve the reflective wavefront characteristics, is given in FIG. 4. It can be seen that the mirror membrane deformation 47 occurs along a curved locus, of which only the central or base portion 58 is relatively flat in the sense of being parallel to the general membrane plane. In previous SLMs the input beam was unfocused, and the portion of the beam that was reflected from the mirror deformation assumed a wavefront that was curved in a fashion similar to the mirror pixel curvature. Since only the relatively flat portion of the reflected light corresponding to the portion of the light reflected from the curvature base 58 was usable, the great majority of the reflected light was simply wasted. With the present invention, by contrast, substantially all of the light for a given pixel is focused by the corresponding microlens 52 onto the curvature base 58 at the center of deformation. Thus, all of the light reflected from the mirror pixel is characterized by a substantially flat wavefront. Furthermore, the microlens 52 extends beyond the limits of the mirror deformation 47 to capture light between deformations that would otherwise be lost from the system. These dual effects can increase the system's optical efficiency by more than 100 times. The beam pixels are re-collimated by the microlenses after reflection from the deformable mirror.

Figure 5A:
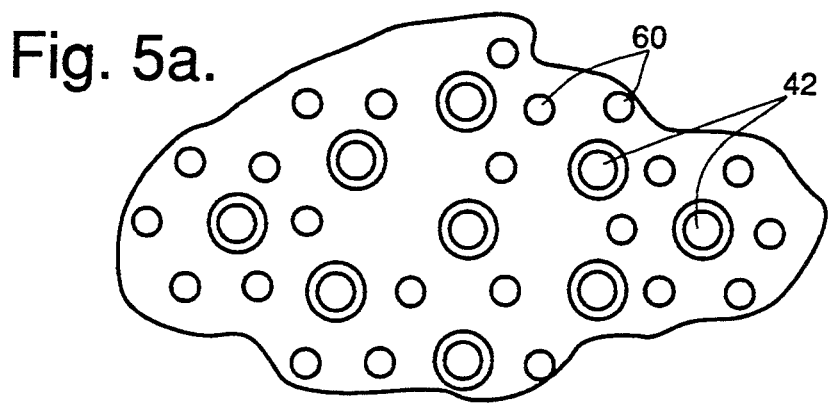
FIGS. 5a and 5b are respectively plan and sectional views of another embodiment of the charge transfer plate.
Figure 5B:
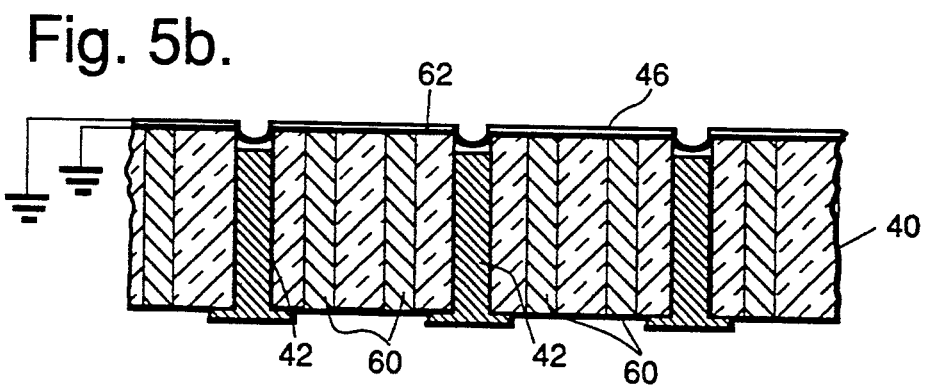

FIGS. 5a and 5b illustrate a further embodiment of the invention, in which the pins of adjacent charge transfer plate pixels are electrically-shielded from each other to prevent the cross-interference previously referred to. The shielding is accomplished with an array of grounding pins 60 that surround each of the charge transfer pins, such as in the hexagonal patterns shown in FIG. 5a. The upper ends of the grounding pins contact a conductive film 62 that is formed over the upper plate surface, with openings for the charge transfer pin locations. The conductive film 62 could be formed over either the upper or lower charge transfer plate surface, and the resistors 54 shown in FIG. 3 could be fabricated between the individual charge transfer pins and the shield plate. When positioned as shown in FIGS. 5a and 5b, the evaporated metallic thin film layer 62 serves both as a ground return for the conducting path through the charge transfer plate substrate, and as a partial electrostatic shield between the adjacent pins.

Figure 6A:
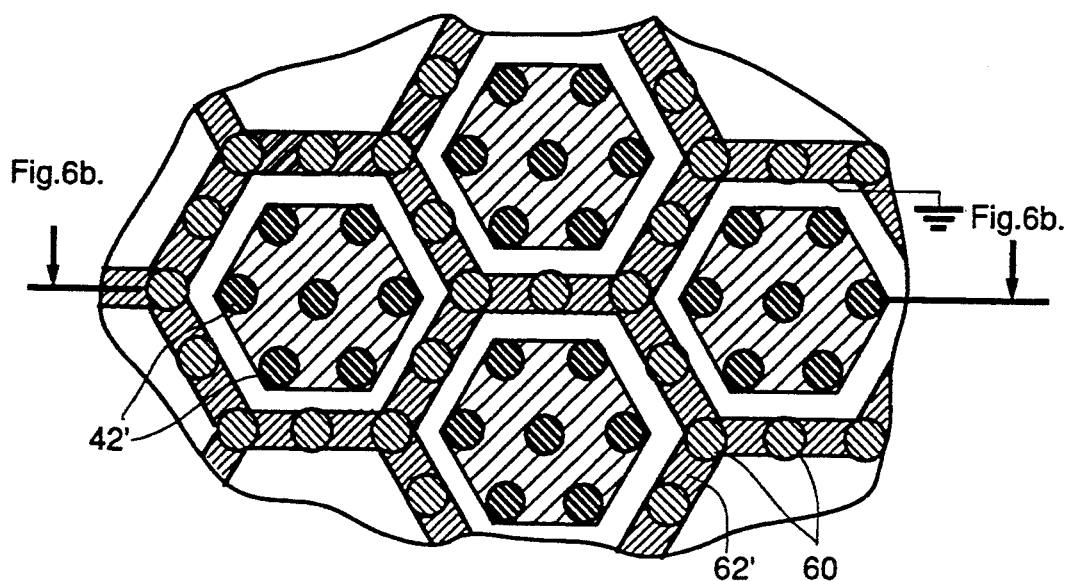
FIGS. 6a and 6b are respectively plan and sectional views of an alternate embodiment for the charge transfer plate.
Figure 6B:
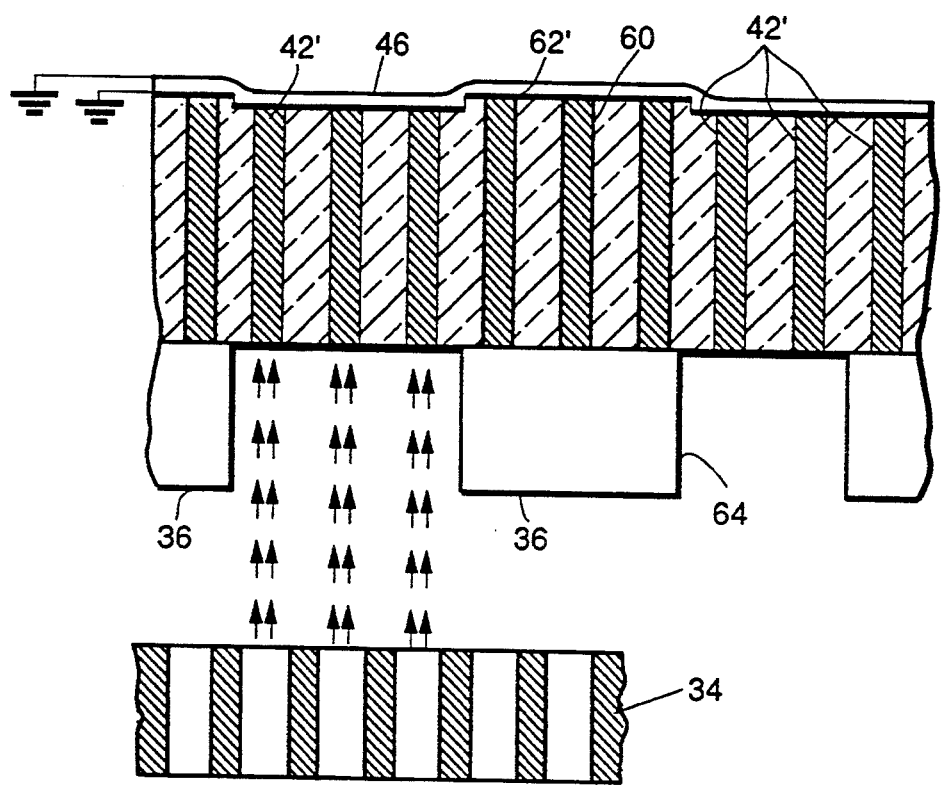

An alternate embodiment for the charge transfer plate is shown in FIGS. 6a and 6b. In this case, a cluster of charge transfer pins 42' is provided for each pixel, and the ground return and shielding pins 60 are interconnected via a hexagonal grid pattern metallic film 62'. This embodiment also shows an alternate method of forming the accelerating grid 36 by making it an integral part of the charge transfer plate, through the use of dielectric spacers 64 (such as $SiO_2$). This configuration has the advantage of self-alignment and reduced secondary-emission electron cross-talk between pixels.

Figure 7A:
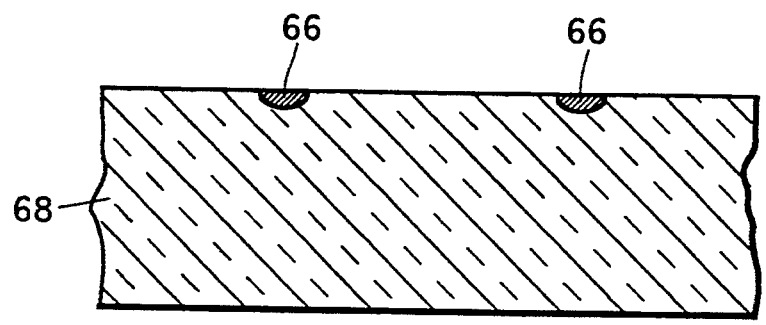
FIGS. 7a, 7b and 7c are sectional views illustrating a thermal migration technique used to fabricate the charge transfer pins.
Figure 7B:
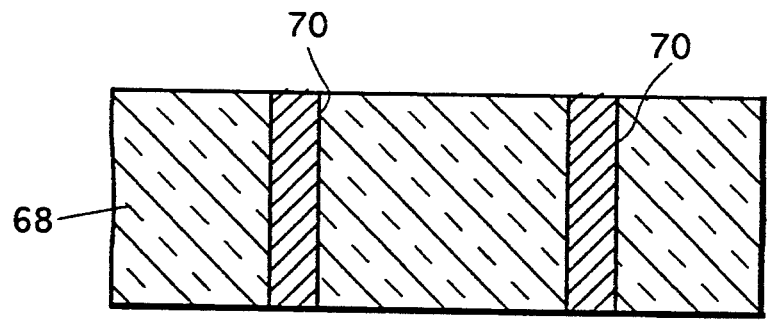
Figure 7C:
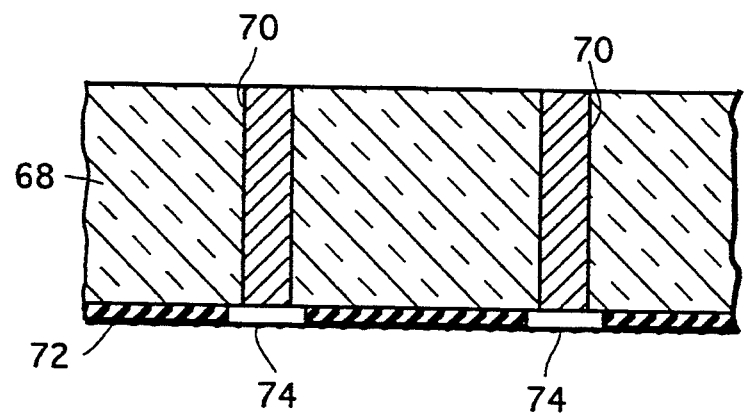

To preserve the photocathode, it is very important that outgassed products from the membrane mirror and from openings within the charge transfer plate be kept away from it. For this purpose the charge transfer plate should be fully impervious to gas leakage. The fabrication of a new structure for the charge transfer plate that achieves this goal is illustrated in FIGS. 7a–7c. It makes use of a thermal migration technique utilized in U.S. Pat. No. 5,032,896 to Garvin et al. and assigned to Hughes Aircraft Company; its contents are incorporated herein by reference. The technique was used in the referenced patent for the fabrication of electrical feedthroughs in 3-dimensional electronic circuits.

A pattern of metallic deposits 66, such as aluminum, are made on one side of the substrate 68 for the charge transfer plate. The metallic deposits 66 are positioned through photolithographic techniques in a pattern that corresponds to the desired locations for the ultimate charge transfer pins, and also for shielding pins if they are used. A thermal gradient is then developed across the substrate as described in U.S. Pat. No. 5,032,896, causing the deposited metal to migrate directly across the substrate to form the charge transfer pins 70 (FIB. 7b). A spacer layer 72, such as $SiO_2$, is next deposited over one face of the charge transfer plate, as shown in FIG. 7c. Openings 74 in the spacer layer are photolithographically established in registration with the charge transfer pins 70 to form cavities into which the membrane mirror pixels can deform.

The prior technique used to establish such mirror pixel cavities was to insert charge transfer pins into openings previously formed through the plate, and to then etch back the pins from one end. Since pins formed in this manner were not precisely positioned, they were not compatible with a spacer layer having precisely patterned openings. However, with the present invention both the metal deposits 66 and the spacer openings 74 are photolithographically patterned, allowing them to be precisely aligned. The resulting charge transfer plate is substantially impervious to gas seepage.

While several illustrative embodiments of the invention have been shown and described, numerous variations and alternate embodiments will occur to those skilled in the art. For example, other applications of the invention not discussed above include wavefront scrubbing of laser light and high speed phase modulation. Non-imaging adaptive optics applications would generally not require the compensating lenslet array. Such variations and alternate embodiments are contemplated, and can be made without departing from the spirit and scope of the invention as defined in the appended claims.

We claim:

1. A spatial light modulator (SLM) for controlling the pixelized phase pattern of an input optical beam in response to the pixelized optical intensity pattern of a control beam, comprising:

a charge transfer plate comprising a substrate, a pixelized array of conductive charge transfer pins extending through said substrate, a spacer layer on one face of said substrate, said spacer layer having openings established therein forming cavities, means responsive to said control beam for accumulating charge on said charge transfer pins in a pixelized charge pattern that corresponds to the pixelized optical intensity pattern of said control beam, a deformable mirror adjacent said one face of said charge transfer plate, said deformable mirror being positioned to receive said input beam and having mirror pixels for responding to a pixelized charge accumulation on corresponding said pins with which respective mirror pixels are aligned with a corresponding pixelized deformation into said cavities to impose a pixelized phase modulation on said input beam, said charge transfer pins, cavities and mirror pixels being aligned, means for connecting to a reference voltage that drains the charge accumulated on said pins, and resistance and capacitance means between said pins and said reference voltage connection, said resistance means being selected to establish, together with said capacitance, a common time constant for draining charge from said pins that allows for a continuous operation of said SLM without interframe charge erasures, wherein said capacitance means comprises pin-to-pin capacitances associated with said charge transfer pins and mirror-to-pin capacitances between said deformable mirror and said charge transfer pins and pin-to-reference voltage connection capacitance associated with said pins and said reference voltage connection, and wherein a pin-to-ground capacitance is larger than the pin-to-pin capacitance.

2. The SLM of claim 1, said charge transfer plate comprising an integral gas impervious structure, with said pins comprising thermally migrated conductors.

3. The SLM of claim 1, said resistance means comprising discrete resistors associated with respective charge transfer pins.

4. The SLM of claim 1, wherein said reference voltage connection comprises a ground connection.

5. The SLM of claim 1, said reference voltage connection comprising an array of conductive contacts on a surface of said charge transfer plate, and said resistance means comprises an array of thin film resistors on said charge transfer plate surface connected between respective reference voltage contacts and charge transfer pins.

6. The SLM of claim 5, wherein a separate resistor is provided for each charge transfer pin pixel.

7. The SLM of claim 1, wherein said deformable mirror pixels form curved deformations characterized by generally flat curvature bases, further comprising an optical focusing means positioned in an input beam path to said deformable mirror, said optical focusing means pixelizing and focusing said input beam onto the curvature bases of said mirror pixels.

8. The SLM of claim 7, said optical focusing means comprising an array of lenslets that are aligned with respective mirror pixels.

9. A spatial light modulator (SLM) for controlling the pixelized phase pattern of an input optical beam in response to the pixelized optical intensity pattern of a control beam, comprising:

a charge transfer plate comprising a pixelized array of conductive charge transfer pins extending through a substrate, means responsive to said control beam for accumulating charge on said charge transfer pins in a pixelized charge pattern that corresponds to the pixelized optical intensity pattern of said control beam, a deformable mirror adjacent an output side of said charge transfer plate, said deformable mirror being positioned to receive said input beam and responding to a pixelized charge accumulation on said pins with a corresponding pixelized deformation to impose a pixelized phase modulation on said input beam, means for connecting to a reference voltage that drains the charge accumulated on said pins, and resistance and capacitance means between said pins and said reference voltage connection, said resistance means being selected to establish, together with said capacitance, a common time constant for draining charge from said pins that allows for a continuous operation of said SLM without interframe charge erasures, and further comprising an array of shield conductors that extend through said charge transfer plate generally parallel to said charge transfer pins to electrically shield said pin pixels from each other.

10. The SLM of claim 9, said charge transfer plate further including a conductive film that is formed on a surface of said plate and electrically connects said shield conductors.

11. A spatial light modulator (SLM) for controlling the pixelized phase pattern of an input optical beam in response to the pixelized optical intensity pattern of a control beam, comprising:

opto-electric conversion means for converting a pixelized optical intensity pattern of a control beam to a pixelized charge pattern, a deformable mirror positioned to be deformed by said pixelized charge pattern in a pixelized array of curved mirror deformations, said deformations having generally flat curvature bases, and optical focusing means comprising an array of lenslets that are aligned with respective mirror pixels positioned in an input beam path to pixelize and focus said input beam onto the curvature bases of said mirror pixels.

12. The SLM of claim 11, wherein said lenslets are positioned to collimate light reflected back from said mirror pixels.

13. The SLM of claim 11, said lenslet array comprising a continuous array of microlenses substantially without gaps between adjacent microlenses.

14. A charge transfer plate, comprising:
an integral, substantially gas impervious insulative substrate, and
an array of thermally migrated charge transfer pins extending through said substrate,
each of said pins including a charge receiving surface on one side of said substrate for accumulating an electric charge on the pins in response to an incident electron beam, said pins being arranged in pixels, further comprising an array of shield conductors that extend through said charge transfer plate generally parallel to said charge transfer pins to electrically shield said pin pixels from each other.

15. The charge transfer plate of claim 14, further comprising a conductive film that is formed on a surface of said substrate and electrically connects said shield conductors.

16. An adaptive optics system for removing undesired phase aberrations from an input target beam that accompanies a returned laser beam upon which similar aberrations have been imposed, comprising:
a spatial light modulator (SLM) having an input side for receiving said aberrated input target beam and said aberrated returned laser beam and a control side for receiving a control beam, said SLM adjusting the pixelized phase pattern of said aberrated input target beam and said aberrated returned laser beam in response to the pixelized intensity pattern of a control beam, said SLM being positioned so that its input side receives said aberrated input target beam and said aberrated returned laser beam,
means for beating said aberrated returned laser beam against an unaberrated reference beam to produce a control beam having a pixelized intensity pattern that corresponds to said aberrations, and for directing said control beam onto the control side of said SLM, said control beam causing said SLM to adjust the pixelized phase pattern of said aberrated input target beam and said aberrated returned laser beam so as to substantially remove said aberrations, and
means for directing said input target beam after processing by said SLM as an output beam,
said SLM comprising:
a charge transfer plate comprising a substrate, a pixelized array of conductive charge transfer pins extending through said substrate, a spacer layer on one face of said substrate, said spacer layer having openings established therein forming cavities,
means responsive to said control beam for accumulating charge on said charge transfer pins in a pixelized charge pattern that corresponds to the pixelized optical intensity pattern of said control beam,
a deformable mirror adjacent said one face of said charge transfer plate, said deformable mirror being positioned to receive said input target beam and having mirror pixels for responding to a pixelized charge accumulation on corresponding said pins with which respective said mirror pixels are aligned with a corresponding pixelized deformation into said cavities to impose a pixelized phase modulation on said input target beam, said charge transfer pins, cavities and mirror pixels being aligned,
means for connecting to a reference voltage that drains the charge accumulated on said pins, and
resistance and capacitance means between said pins and said reference voltage connection, said resistance means being selected to establish, together with said capacitance, a time constant for draining charge from said pins that allows for a continuous operation of said SLM without interframe charge erasures, wherein said capacitance means comprises pin-to-pin capacitances associated with said charge transfer pins and mirror-to-pin capacitances between said deformable mirror and said charge transfer pins and pin-to-reference voltage connection capacitance associated with said pins and said reference voltage connection, and wherein a pin-to-ground capacitance is larger than the pin-to-pin capacitance.

17. The adaptive optics system of claim 16, said resistance means comprising discrete resistors associated with respective charge transfer pins.

18. The adaptive optics system of claim 16, said reference voltage connection comprising an array of conductive contacts on a surface of said charge transfer plate, and said resistance means comprises an array of thin film resistors on said charge transfer plate surface connected between respective reference voltage contacts and charge transfer pins.

19. The adaptive optics system of claim 18, wherein a separate resistor is provided for each charge transfer pin pixel.

20. The adaptive optics system of claim 16, said SLM further including an array of lenslets for focusing on input beam onto respective mirror pixels.

21. An adaptive optics system for removing undesired phase aberrations from an input optical target beam that accompanies a returned laser beam upon which similar aberrations have been imposed, comprising:
a spatial light modulator (SLM) having an input side for receiving said aberrated input target beam and said aberrated returned laser beam and a control side for receiving a control beam, said SLM adjusting the pixelized phase pattern of said aberrated input target beam and said aberrated returned laser beam in response to the pixelized intensity pattern of said control beam, said SLM being positioned so that its input side receives said aberrated input target beam and said aberrated returned laser beam,
means for beating said aberrated returned laser beam against an unaberrated reference beam to produce said control beam having a pixelized intensity pattern that corresponds to said aberrations, and for directing said control beam onto the control side of said SLM, said control beam causing said SLM to adjust the pixelized phase pattern of said aberrated input target beam and said aberrated returned laser beam so as to substantially remove said aberrations, and means for directing said input target beam after processing by said SLM as an output beam, said SLM comprising:

opto-electric conversion means for converting a pixelized optical intensity pattern of Said control beam to a pixelized charge pattern, a deformable mirror having mirror pixels positioned to be deformed by said pixelized charge pattern in a pixelized array of curved mirror deformations, said deformations having generally flat curvature bases, and optical focusing means comprising an array of lenslets that are aligned with respective mirror pixels positioned in an input beam path to pixelize and focus said input beam onto the curvature bases of said mirror pixels.

22. The adaptive optics system of claim 21, wherein said lenslets invert the mirror pixel images, said means for directing the input target beam and the returned laser beam after processing by said SLM including an additional lenslet array and plane mirror combination in the path of said processed input target beam for reinverting said pixel images.

23. The adaptive optics system of claim 22, said means for directing the input target beam and the returned laser beam after processing by said SLM further including a beam splitter for directing one portion of said input target and returned laser beams towards said beam beating means and another portion of said beams towards said additional lenslet array and plane mirror combination, and a filter for blocking said another portion of the returned laser beam but not said another portion of the input target beam.

24. A method of operating a spatial light modulator (SLM) in a continuous mode, the SLM including a charge transfer plate that accumulates a pixelized charge pattern in response to the pixelized optical intensity pattern of a control beam, and modulates the pixelized deformation of a deformable mirror having an array of mirror pixels to adjust the pixelized phase pattern of an input beam, said method comprising:

applying charge to said charge transfer plate to accumulate a pixelized charge pattern thereon in response to said control beam, said charge transfer plate comprising a pixelized array of conductive charge transfer pins extending through a substrate, deforming said deformable mirror so that the mirror deformation at each pixel location is in response to accumulated charge on a corresponding charge transfer pin with which said mirror pixel location is spatially aligned so that the deformation at each pixel location varies as a function of the amount of phase distortion present at the corresponding pixel location in the input beam, draining charge from each of said pins of said charge transfer plate at a controlled rate through respective R-C circuits for each of said pixels, and continuing to accumulate charge on said charge transfer plate for the duration of said control beam under the control of said beam, the rate at which charge is drained from said charge transfer plate being selected to be slow enough to sustain an accumulated charge for a constant rate of charge application to the charge transfer plate, but fast enough for the accumulated charge to respond to a change in the rate of charge application within a desired response rate.

25. The method of claim 24, wherein the R-C circuit for each pixel is established by connecting a resistor between the pins of each pixel and a voltage reference, and by its pin-to-pin and mirror-to-pin capacitances.

26. The method of claim 24, wherein said mirror establishes a pixelized array of curved deformations in response to the pixelized charge pattern on said charge transfer plate, said mirror deformations being characterized by generally flat curvature bases, further comprising the step of focusing an input beam on a pixelized basis onto said curvature bases to generally preserve the wave curvature of said input beam pixels upon reflection from said mirror.

* * * * *